United States Patent
Yim et al.

(10) Patent No.: US 10,160,307 B2
(45) Date of Patent: Dec. 25, 2018

(54) SYSTEM AND METHOD FOR CONTROLLING MOTOR TEMPERATURE FOR GREEN CAR

(71) Applicant: HYUNDAI MOTOR COMPANY, Seoul (KR)

(72) Inventors: Jeongbin Yim, Incheon (KR); Jinho Kim, Gunpo-si (KR); Kil Young Youn, Suwon-si (KR); Jae Sang Lim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/598,836

(22) Filed: May 18, 2017

(65) Prior Publication Data

US 2018/0126840 A1     May 10, 2018

(30) Foreign Application Priority Data

Nov. 7, 2016     (KR) .......................... 10-2016-0147728

(51) Int. Cl.
*B60K 11/02*     (2006.01)
*B60L 11/18*     (2006.01)
*B60W 20/00*     (2016.01)

(52) U.S. Cl.
CPC ........... *B60K 11/02* (2013.01); *B60L 11/1861* (2013.01); *B60W 20/00* (2013.01)

(58) Field of Classification Search
USPC ........................................................ 701/22
See application file for complete search history.

(56) References Cited

U.S. PATENT DOCUMENTS

| | | | |
|---|---|---|---|
| 2010/0236502 A1* | 9/2010 | Watanabe | B60K 6/48 123/41.02 |
| 2013/0239910 A1* | 9/2013 | Teraya | B60W 10/06 123/41.02 |
| 2016/0144691 A1* | 5/2016 | Youn | F01P 7/165 165/51 |

FOREIGN PATENT DOCUMENTS

| | | |
|---|---|---|
| JP | 2008-236955 A | 10/2008 |
| JP | 5981439 B2 | 8/2016 |
| KR | 10-1427969 B1 | 8/2014 |

* cited by examiner

*Primary Examiner* — Tyler D Paige
(74) *Attorney, Agent, or Firm* — Brinks Gilson & Lione (57) ABSTRACT

The present disclosure provides a system and a method of controlling motor temperature for a green car including: a drive motor as a power source; a battery configured to provide a driving voltage to the drive motor; a water pump configured to supply coolant to the drive motor to cool the drive motor; a data detector configured to detect data regarding a driving state of the green car; and a vehicle controller configured to determine a driving mode based on the data regarding the driving state, to determine pump control rotation speed based on the driving mode, SOC of the battery, or motor temperature of the drive motor, and to operate the water pump based on the pump control rotation speed to change flow rate of the coolant supplied to the drive motor.

19 Claims, 7 Drawing Sheets

SYSTEM AND METHOD FOR CONTROLLING MOTOR TEMPERATURE FOR GREEN CAR

CROSS-REFERENCE TO RELATED APPLICATION

This application claims priority to and the benefit of Korean Patent Application No. 10-2016-0147728, filed on Nov. 7, 2016, which is incorporated herein by reference in its entirety.

FIELD

The present disclosure relates to a system of controlling motor temperature for a green car, and more particularly to a system and a method of controlling motor temperature for a green car that can control flow rate of coolant to manage temperature of a drive motor.

BACKGROUND

The statements in this section merely provide background information related to the present disclosure and may not constitute prior art.

As problems of environmental pollution are getting more serious, use of non-polluting energy is becoming increasingly important. One of major causes of air pollution is exhaust gas from vehicles.

To mitigate such problems and to enhance fuel economy, environmentally-friendly vehicles (green cars) have been developed and used.

Recently, plug-in hybrid vehicles have been developed. The plug-in hybrid vehicle has a battery capacity greater than a conventional hybrid vehicle Also, the plug-in hybrid vehicle charges a battery using external electricity such that the vehicles run a short distance with an electric vehicle (EV) mode and run with a hybrid electric vehicle (HEV) mode when the battery is depleted.

The plug-in hybrid vehicle is driven by using both or either of an engine operated by petroleum and a drive motor in the same manner as a conventional hybrid vehicle. However, the plug-in hybrid vehicle has a high voltage battery that has a large capacity, which also allows to get charged by external electricity.

According to the plug-in hybrid vehicle, the engine is operated and a state of charge (SOC) of the high voltage battery is charged using remaining driving torque of the engine to increase a time which the vehicle runs with the EV mode.

If a forcible charging method is used in the plug-in hybrid vehicle, temperature of the drive motor rises due to current. In this case, the vehicle cannot run with the EV mode, but with power of the engine. Therefore, the merits of the green car may not be significant and fuel economy may also be lowered.

SUMMARY

The present disclosure provides a system and a method of controlling motor temperature for a green car capable of controlling flow rate of coolant in order to manage temperature of a drive motor.

Another form of the present disclosure provides a system and a method of controlling motor temperature for a green car having further advantages of controlling a water pump in accordance with driving mode of the vehicle and a state of charge (SOC) of a battery.

A system of controlling motor temperature for a green car in some forms of the present disclosure may include: a drive motor as a power source; a battery configured to provide a driving voltage to the drive motor, a water pump configured to supply coolant to the drive motor to cool the drive motor; a data detector configured to detect data regarding a driving state of the green car; and a vehicle controller configured to determine a driving mode based on the data regarding the driving state of the green car, determine pump control rotation speed based on the driving modes, a SOC of the battery, or the motor temperature of the drive motor, and operate the water pump based on the pump control rotation speed to change flow rate of the coolant supplied to the drive motor.

The vehicle controller may operate the water pump with first pump control rotation speed when the driving mode is a forcible charging mode.

The vehicle controller may determine whether the SOC of the battery is lower than a reference value when the driving mode is a running mode, determine whether the motor temperature is higher than or equal to first reference temperature when the SOC of the battery is lower than the reference value, determine whether the motor temperature is higher than or equal to second reference temperature when the motor temperature is greater than or equal to the first reference temperature, and operate the water pump with the first pump control rotation speed when the motor temperature is greater than or equal to the second reference temperature.

The vehicle controller may operate the water pump with second pump control rotation speed when the SOC of the battery is lower than the reference value, and the motor temperature is greater than or equal to the first reference temperature and is lower than the second reference temperature.

The vehicle controller may operate the water pump with third pump control rotation speed when the SOC of the battery is lower than the reference value and the motor temperature is less than the first reference temperature.

The vehicle controller may determine whether the motor temperature is greater than or equal to first reference temperature when the driving mode is the running mode and the SOC of the battery is greater than or equal to reference value, and operate the water pump with first pump control rotation speed when the motor temperature is greater than or equal to the first reference temperature.

The vehicle controller may operate the water pump with second pump control rotation speed when the SOC of the battery is greater than or equal to the reference value and the motor temperature is lower than the first reference temperature.

The pump control rotation speed may be determined as any one from the first pump control rotation speed, the second pump control rotation speed, or the third pump control rotation speed that are predetermined differently from one other based on the driving mode, the SOC of the battery and the motor temperature of the drive motor.

The first pump control rotation speed may be the highest, the second pump control rotation speed may be lower than the first pump control rotation speed, and the third pump control rotation speed may be the lowest.

A method of controlling motor temperature for a green car in another form of the present disclosure may include: determining driving mode of the green car; determining, when the driving mode is a running mode, whether a SOC of a battery is lower than a reference value; determining, when the SOC of the battery is lower than the reference value, whether motor temperature is greater than or equal to first reference temperature; determining, whether the motor temperature is greater than or equal to the first reference temperature, whether the motor temperature is greater than or equal to the second reference temperature; and operating a water pump with a first pump control rotation speed when the motor temperature is greater than or equal to second reference temperature.

The method may further include operating the water pump with second pump control rotation speed when the motor temperature is less than the second reference temperature at the determining whether the motor temperature is higher than or equal to the second reference temperature.

The method may further include operating the water pump with third pump control rotation speed when the motor temperature is less than the first reference temperature at the determining whether the motor temperature of the drive motor is greater than or equal to the first reference temperature.

When the SOC of the battery is greater than or equal to the reference value at the determining whether the SOC of the battery is less than the reference value, the method may further include: determining whether the motor temperature is greater than or equal to the first reference temperature; and operating the water pump with the first pump control rotation speed when the motor temperature is greater than or equal to the first reference temperature.

The method may further include: operating the water pump with second pump control rotation speed when the motor temperature is less than the first reference temperature at the determining whether the motor temperature is greater than or equal to the first reference temperature.

The method may further include operating the water pump with the first pump control rotation speed when the driving mode is a forcible charging mode at the determining the driving mode of the green car.

A method of controlling motor temperature for a green car in other forms of the present disclosure may include: determining a driving mode of the green car based on data regarding a driving state; determining first pump control rotation speed when the driving mode is a forcible charging mode; and operating a water pump with the first pump control rotation speed to control flow rate of coolant supplied to a drive motor.

When the driving mode is a running mode at the determining the driving mode of the vehicle, the method may further include: determining pump control rotation speed based on a SOC of a battery and a motor temperature of the drive motor; operating the water pump with the pump control rotation speed.

The method may include: determining first pump control rotation speed as the pump control rotation speed when the SOC of the battery is greater than or equal to a reference value and the motor temperature is greater than or equal to first reference temperature at the determining the pump control rotation speed; and determining second pump control rotation speed as the pump control rotation speed when the SOC of the battery is greater than or equal to the reference value and the motor temperature is less than the first reference temperature at the determining the pump control rotation speed.

The method may include: determining first pump control rotation speed as the pump control rotation speed when the SOC of the battery is less than reference value, the motor temperature is greater than or equal to first reference temperature, and the motor temperature is greater than or equal to second reference temperature at the determining the pump control rotation speed; determining second pump control rotation speed as the pump control rotation speed when the SOC of the battery is less than the reference value, the motor temperature is greater than or equal to the first reference temperature, and the motor temperature is less than the second reference temperature at the determining the pump control rotation speed; and determining third pump control rotation speed as the pump control rotation speed when the SOC of the battery is less than the reference value and the motor temperature is less than the first reference temperature at the determining the pump control rotation speed.

In some forms of the present disclosure, time for which a vehicle runs with power of a drive motor may be increased by increasing flow rate of coolant in advance and fuel economy may be improved.

Since a water pump is controlled to cool a drive motor based on vehicle driving mode and SOC of a battery, performance and marketability of the drive motor may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
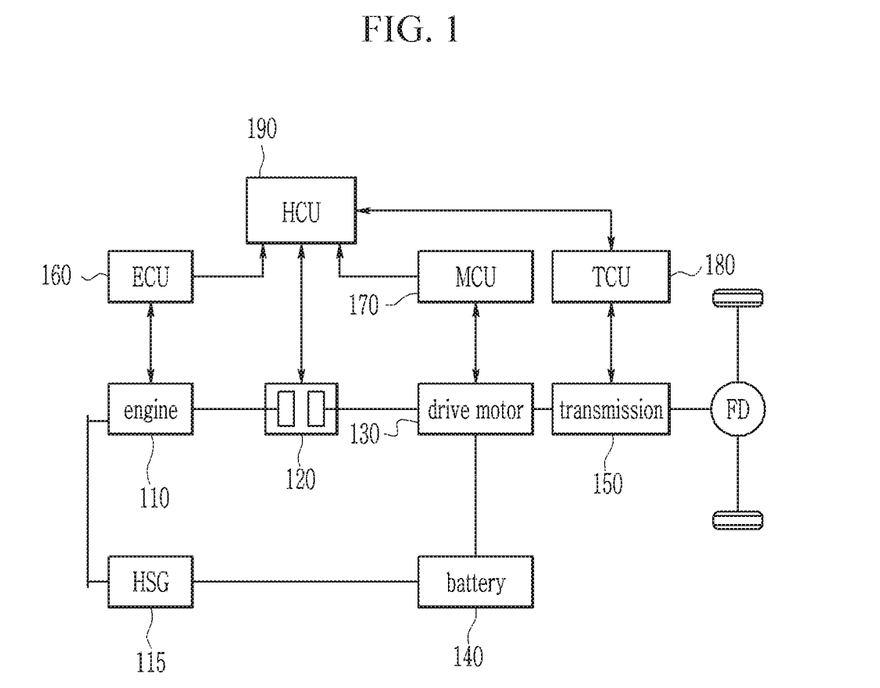
FIG. 1 is a diagram illustrating main constituent elements of a green car to which a system of controlling motor temperature for a green car is applicable.

FIG. 1 is a diagram illustrating main constituent elements of a green car to which a system of controlling motor temperature for a green car is applicable in some forms of the present disclosure. A plug-in hybrid vehicle is illustrated as one example of green cars in FIG. 1. However, a system of controlling motor temperature in some forms of the present disclosure can be applied to any green car using a motor as power source as well as a plug-in hybrid vehicle illustrated in FIG. 1.

Referring to FIG. 1, a green car to which a system of controlling motor temperature is applicable in some forms of the present disclosure includes an engine 110, a hybrid integrated starter-generator 115 (it will hereinafter be called 'HSG'), an engine clutch 120, a drive motor 130, a battery 140, a transmission 150, an engine controller 160 (it will hereinafter be called 'ECU'), a motor controller 170 (it will hereinafter be called 'MCU'), a transmission controller 180 (it will hereinafter be called 'TCU') and a hybrid controller 190 (it will hereinafter be called 'HCU').

The engine 110 burns fuel to generate power. That is, the engine 110 may be any one of well-known various engines such as a gasoline engine and a diesel engine, etc. using a typical fossil fuel. Power of the engine 110 may be transmitted toward the transmission 150.

The HSG 115 starts the engine 110, or operates as a generator to generate electrical energy when the engine 110 is operated.

The engine clutch 120 is disposed between the engine 110 and the drive motor 130 and is operated by control of the HCU 190 to operably connect or disconnect the engine 110 and the drive motor 130. That is, the engine clutch 120 operably connects or disconnects the engine 110 and the drive motor 130 according to switching between EV mode and HEV mode.

The drive motor 130 is operated by three-phase AC voltage supplied from the battery 140 through an inverter (not shown) to generate torque. The drive motor 130 is operated as a generator to supply regenerative energy to the battery 140 in coasting or regenerative braking.

The battery 140 includes a plurality of unit cells, and high voltage for supplying driving voltage to the drive motor 130 is stored in the battery 140. The battery 140 supplies the driving voltage to the drive motor 130 at the EV mode or the HEV mode, and is charged by voltage generated in the drive motor 130 in the regenerative braking.

The transmission 150 receives output torque of the engine 110 when engaging the engine clutch 120 or output torque of the drive motor 130, and changes the output torque of the engine 110 and/or the output torque of drive motor 130 into target torque. That is, a suitable gear stage is selected according to a vehicle speed and a driving condition and the received output torque is changed into the target torque. Then, the vehicle runs by outputting the changed target torque to a driving wheel as the driving torque.

The ECU 160 is connected with the HCU 190 in wire or wireless manner, and controls, together with the HCU 190, overall operations of the engine 110 based on a demand torque signal of a driver and operating state of the engine such as a coolant temperature, an engine speed, a throttle valve opening, an intake amount, an oxygen amount, an engine torque, etc. The ECU 160 transmits the operating state of the engine 110 to the HCU 190.

The MCU 170 controls operation and torque of the drive motor 130 by control of the HCU 190, and causes voltage generated by the drive motor 130 in the regenerative braking to be stored in the battery 140. The MCU 170 controls overall operation of the driver motor based on demand torque signal of the driver, running mode of the vehicle and state of charge (SOC) of the battery 140.

The TCU 180 controls a gear ratio according to output signals of the ECU 160 and the MCU 170 and determines regenerative braking amount. That is, The TCU 180 controls overall operation of the transmission 150. The TCU 180 transmits operating state of the transmission 150 to the HCU 190.

The HCU 190 is a top rank controller that determines running mode of the vehicle and controls overall operation of the vehicle. The HCU 200 controls low rank controllers connected through network. For example, the HCU 200 may be connected to the low rank controllers through controller area network (CAN). The HCU 200 gathers and analyzes information of the low rank controllers and controls the output torques of the engine 110 and/or the drive motor 130 cooperatively with the low rank controllers.

Since general operation of the plug-in hybrid vehicle in some forms of the present disclosure supporting the above-mentioned functions is the same as or is similar to that of a conventional plug-in hybrid vehicle, detailed description thereof will be omitted.

Figure 2:
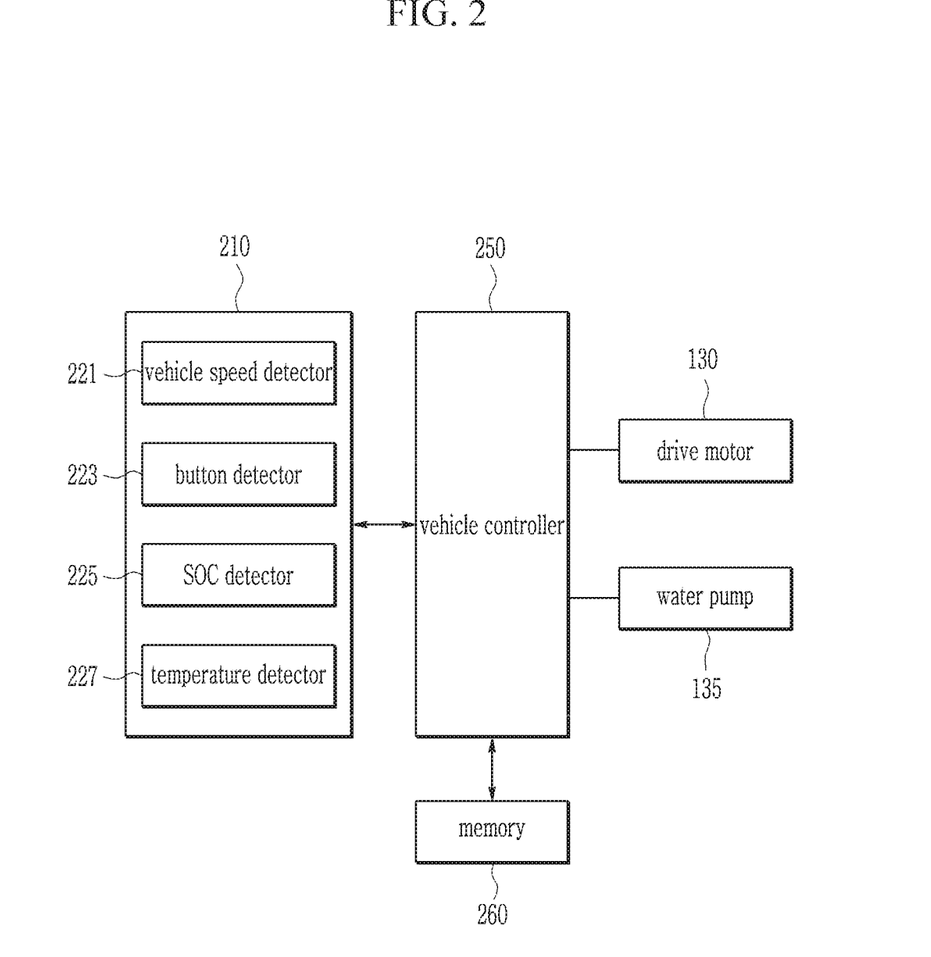
FIG. 2 is a block diagram of a system of controlling motor temperature.

FIG. 2 is a block diagram of a system of controlling motor temperature in some forms of the present disclosure. Some steps of a method of controlling motor temperature in some forms of the present disclosure may be performed by the MCU 170 and other steps thereof may be performed by the HCU 190. Further, since the MCU 170 and the HCU 190 may be embodied as one vehicle controller 250 in some forms of the present disclosure, for the ease of description the MCU 170 and the HCU 190 will be called the vehicle controller 250, unless explicitly described otherwise in this specification and claims.

Referring to FIG. 2, the system of controlling motor temperature for a green car includes the drive motor 130, a water pump 135, a data detector 210, the vehicle controller 250 and a memory 260.

The drive motor 130 is operated by three-phase AC voltage applied from the vehicle controller 250 to generate the torque. The drive motor 130 may be cooled by coolant from the water pump 135.

The water pump 135 supplies the coolant to the drive motor 130. That is, the water pump 135 is operated by control of the vehicle controller 250 to supply the coolant to the drive motor 130. The water pump 135 may be an electric water pump (EWP) 135.

The data detector 210 detects driving state data for controlling the motor temperature. For this purpose, the data detector 210 includes a vehicle speed detector 221, a button detector 223, an SOC detector 225 and a temperature detector 227.

The vehicle speed detector 221 detects vehicle speed and transmits the detected vehicle speed to the vehicle controller 250. The vehicle speed detector 221 may be mounted on a wheel of the vehicle.

If the vehicle speed detector 213 is not provided, the vehicle controller 250 may calculate the vehicle speed using a GPS signal received from a GPS.

The button detector 223 detects whether a forcible charge button is pushed or not. That is, the button detector 223 detects button-on of the forcible charge button if a driver pushes the forcible charging button, and transmits button-on signal to the vehicle controller 250. Here, the forcible charge button may be a button that a driver can push to charge the battery 140 forcibly.

The SOC detector 225 detects state of charge (SOC) of the battery 140 and transmits the detected SOC of the battery 140 to the vehicle controller 250.

The temperature detector 227 detects temperature of the drive motor 130 and transmits the detected motor temperature to the vehicle controller 250.

The vehicle controller 250 controls the drive motor 130, the water pump 135, the data detector 210 and the memory 260 that are constituent elements of the system of controlling motor temperature for a green car.

In other words, the vehicle controller 250 receives the driving state data from the data detector 210 and determines driving mode based on the driving state data.

In addition, the vehicle controller 250 predicts in advance that the temperature of the drive motor 130 rises and controls operation of the water pump 135. In other words, the vehicle controller 250 calculates pump control rotation speed according to the driving mode, the SOC of the battery 140 and the motor temperature of the drive motor 130, and operates the water pump 135 with the pump control rotation speed to change amount of the coolant supplied to the drive motor 130. Here, the pump control rotation speed may be a target rotation speed of the water pump 135 for operating the water pump 135 and may be a predetermined value. The pump control rotation speed may be set by a designer or through a predetermined algorithm (e.g., program and/or probability model).

Figure 3:
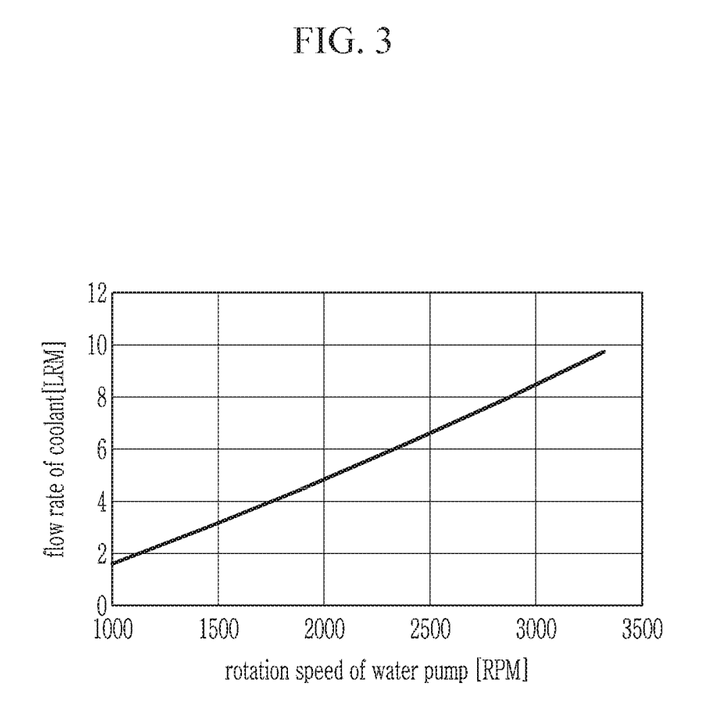
FIG. 3 is a graph illustrating flow rate of coolant vs. rotation speed of a water pump in a green car.
Figure 4:
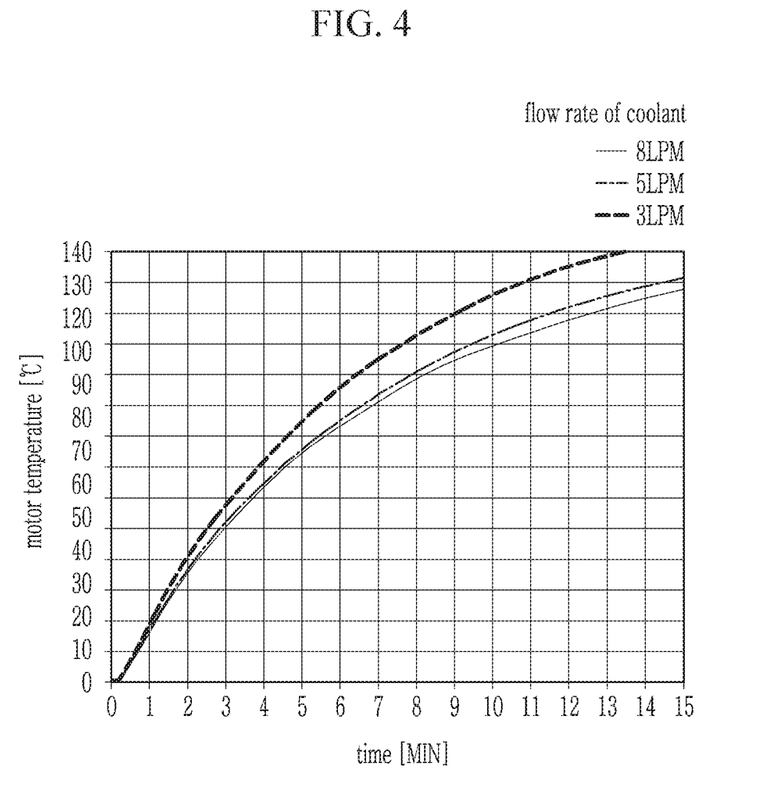
FIG. 4 is a graph illustrating motor temperature vs. flow rate of coolant in a green car.

As shown in FIG. 3, flow rate of the coolant increases if the rotation speed of the water pump 135 is increased. As shown in FIG. 4, the motor temperature is lowered if the flow rate of the coolant is increased. Therefore, the motor temperature of the drive motor 130 can be controlled by controlling the rotation speed of the water pump 135.

For this purpose, the vehicle controller 250 may be implemented by at least one processor operated by a predetermined program and the predetermined program may be programmed to perform each step of a method of controlling motor temperature for a green car in some forms of the present disclosure. The method of controlling motor temperature for a green car will be described in detail with reference to FIG. 5 to FIG. 7.

The memory 260 stores data required to control the constituent elements of the system of controlling motor temperature and data generated or detected by the constituent elements of the system of controlling motor temperature. For example, the memory 260 may store the driving state data detected by the data detector 210.

The memory 260 may store the pump control rotation speed for operating the water pump 135, store first reference temperature and second reference temperature for controlling the motor temperature of the drive motor 130, and store a reference value for managing the SOC of the battery 140.

The memory 260 may also store various programs for controlling overall operation of the system of controlling motor temperature for a green car.

The memory 260 may provide necessary data based on request of the data detector 210 and the vehicle controller 250.

The memory 260 may be a unified memory or may be divided into a plurality of memories. For example, the memory 260 may be ROM (Read Only Memory), RAM (Random Access Memory) and flash memory, etc.

Hereinafter, the method of controlling motor temperature for a green car will be described with reference to FIG. 5 to FIG. 7.

Figure 5:
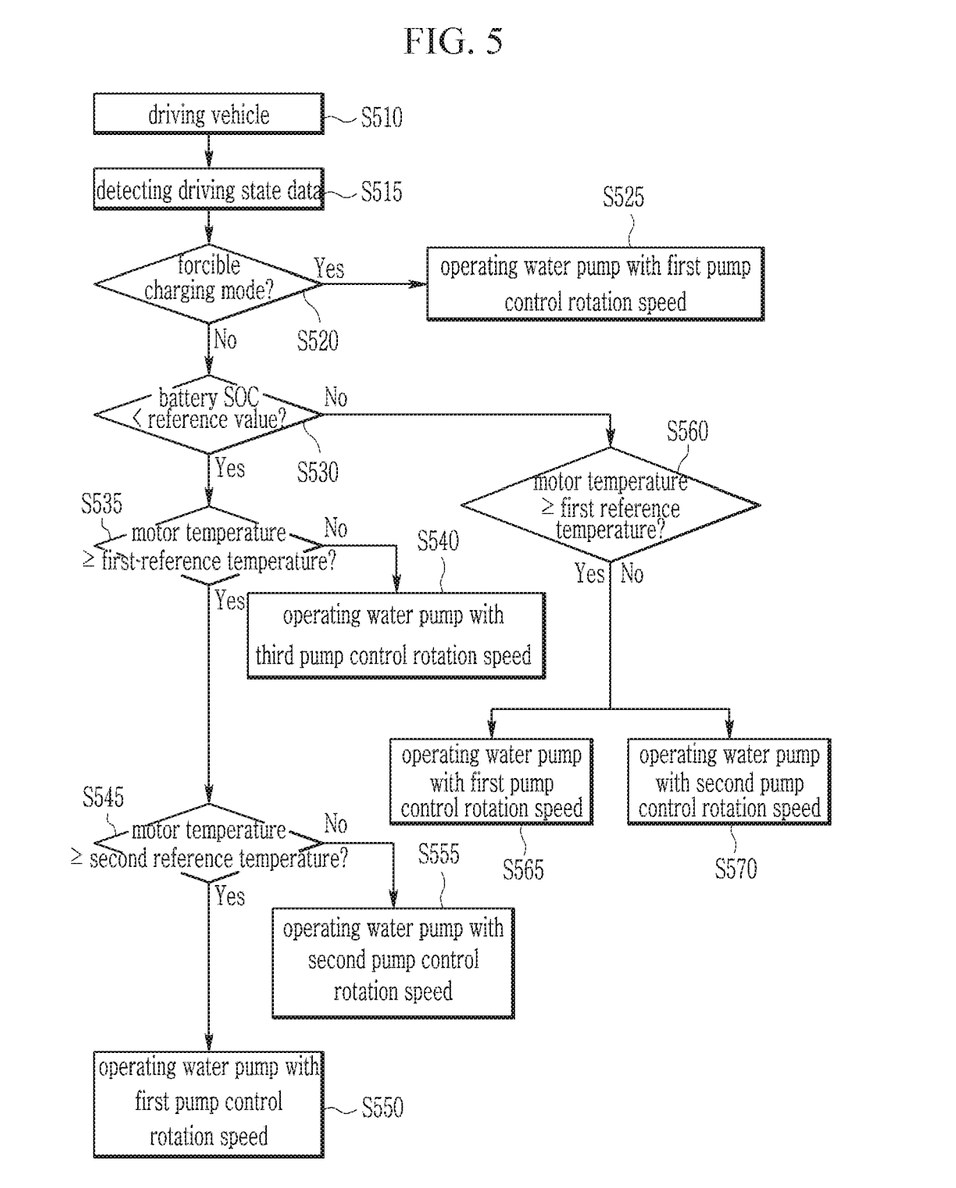
FIG. 5 is a flowchart of a method of controlling motor temperature.

FIG. 5 is a flowchart of a method of controlling motor temperature in some forms of the present disclosure.

Referring to FIG. 5, if a driver starts the vehicle, the vehicle controller 250 drives the vehicle at step S510. In other words, the vehicle controller 250 receives starting-on signal from an ignition detector (not shown) to determine that the vehicle is started. If the vehicle is started, the vehicle controller 250 operates at least one of the engine 110 and the drive motor 130 according to demand of the driver to drive the vehicle.

The vehicle controller 250 detects the driving state data at step S515. In other words, the data detector 210 detects the driving state data including at least one of the vehicle speed, the button-on signal, the SOC of the battery 140 and the motor temperature. The data detector 210 provides the detected driving state data to the vehicle controller 250. The vehicle controller 250 checks the driving state data received from the data detector 210.

The vehicle controller 250 determines based on the driving state data whether the driving mode is a forcible charging mode at step S520. If the vehicle controller 250 receives the button-on signal from the data detector 210, the vehicle controller 250 determines that the driving mode is the forcible charging mode based on the button-on signal. At this time, the forcible charging mode is a mode where the engine 110 is operated and the battery 140 is charged by driving torque of the engine 110 in order to increase running time at the EV mode.

If the driving mode is the forcible charging mode, the vehicle controller 250 operates the water pump 135 with first pump control rotation speed at step S525.

In other words, if the driving mode is the forcible charging mode, the vehicle controller 250 reads a first pump control rotation speed through a predetermined control table. Here, the control table is a table in which the rotation speed of the water pump 135 is set to control the motor temperature of the drive motor 130. In the control table, the pump control rotation speed may be set according to the driving mode, the SOC of the battery 140 and the motor temperature. The control table may be set through a predetermined algorithm (e.g., program and/or probability model).

Figure 6:
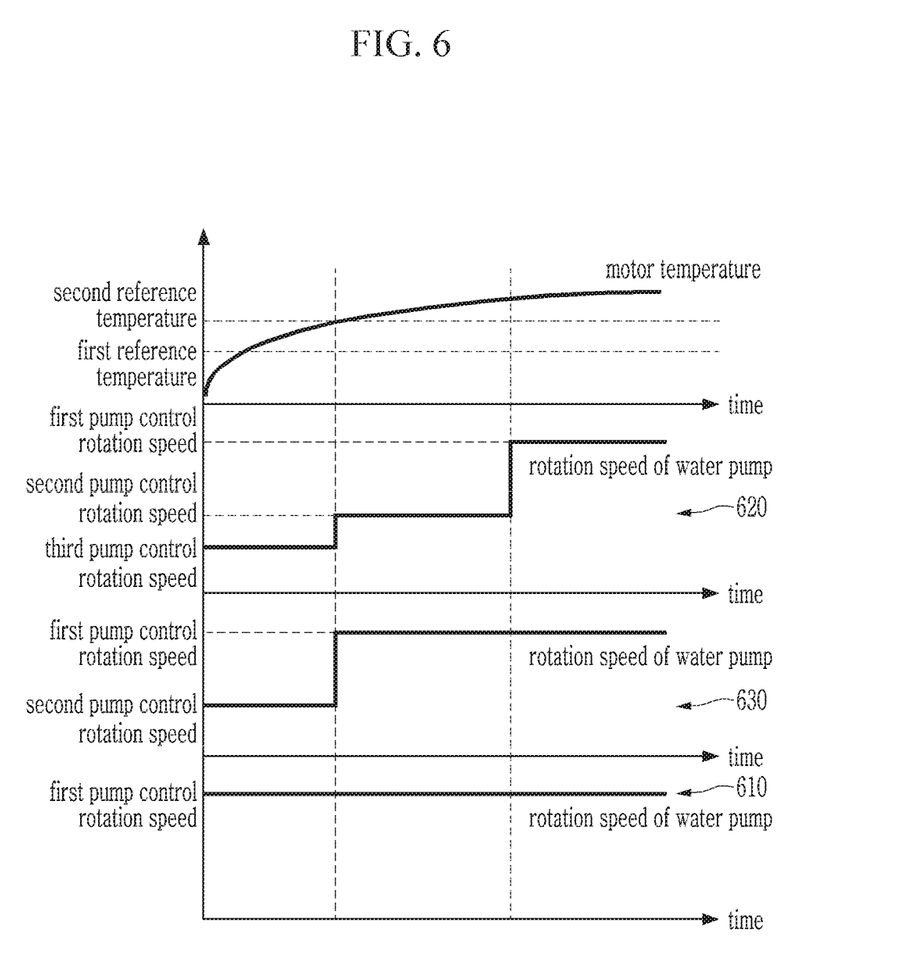
FIG. 6 is a graph illustrating motor temperature and water pump rotation speed applicable to a method of controlling motor temperature.

One exemplary control table is shown in FIG. 6. As shown in FIG. 6, first pump control rotation speed to third pump control rotation speed that are different from each other are set in the one example of the one exemplary control table. The first pump control rotation speed is the highest, the second pump control rotation speed is lower than the first pump control rotation speed, and the third pump control rotation speed is the lowest.

Reference numeral '610' in FIG. 6 represents a control table in the forcible charging mode. In the forcible charging mode, the vehicle controller 250 operates the water pump 135 with the first pump control rotation speed.

If the driving mode is the forcible charging mode, there is high probability that the vehicle runs at the EV mode after charging is completed, and therefore, the motor temperature of the drive motor 130 rises. Therefore, the water pump 135 rotates quickly to increase flow rate of the coolant and to minimize increase in the motor temperature of the drive motor 130 in the forcible charging mode.

Reference numeral '620' in FIG. 6 represents a control table when the SOC of the battery 140 is low in running mode.

If the driving mode is not the forcible charging mode (i.e., the driving mode is the running mode), the vehicle controller 250 determines whether the SOC of the battery 140 is lower than the reference value at step S530. In further detail, the vehicle controller 250 determines based on the driving state data that the driving mode is the running mode. For example, the vehicle controller 250 determines that the driving mode is the running mode based on the vehicle speed, off signal of the forcible charge button, operating state of the drive motor 130 and the engine 110, and etc. In addition, the vehicle controller 250 determines whether the SOC of the battery 140 is lower than the reference value. Here, the reference value is used to determine charging state of the battery 140 and may be set through a predetermined algorithm (e.g., program and/or probability model).

If the SOC of the battery 140 is lower than the reference value, the vehicle controller 250 determines whether the motor temperature is higher than or equal to first reference temperature at step S535. Here, the first reference temperature is predetermined temperature for controlling the rotation speed of the water pump 135 according to the motor temperature, and may be set through a predetermined algorithm (e.g., program and/or probability model).

If the motor temperature is lower than the first reference temperature, the vehicle controller 250 operates the water pump 135 with third pump control rotation speed at step S540. In other words, if the motor temperature is lower than the first reference temperature, the vehicle controller 250 reads the third pump control rotation speed through the control table. That is, the vehicle controller 250 operates the water pump 135 with the third pump control rotation speed read from the control table that is designated as reference numeral '620' in FIG. 6 and increases the flow rate of the coolant supplied to the drive motor 130.

If the motor temperature is higher than or equal to the first reference temperature, the vehicle controller 250 determines whether the motor temperature is higher than or equal to second reference temperature at step S545. Here, the second reference temperature is predetermined temperature for controlling the rotation speed of the water pump 135 according to the motor temperature, and may be higher than the first reference temperature. The second reference temperature may be set through a predetermined algorithm (e.g., program and/or probability model).

If the motor temperature is higher than or equal to the second reference temperature, the vehicle controller 250 operates the water pump 135 with the first pump control rotation speed at step S550. That is, if the motor temperature is higher than or equal to the second reference temperature, the vehicle controller 250 reads the first pump control rotation speed through the control table. That is, the vehicle controller 250 operates the water pump 135 with the first pump control rotation speed read from the control table that is designated as reference numeral '620' in FIG. 6 to supply the coolant to the drive motor 130.

If the motor temperature is lower than the second reference temperature, the vehicle controller 250 operates the water pump 135 with second pump control rotation speed at step S555. In other words, if the motor temperature is lower than the second reference temperature, the vehicle controller 250 reads the second pump control rotation speed through the control table. That is, the vehicle controller 250 operates the water pump 135 with the second pump control rotation speed read from the control table that is designated as reference numeral '620' in FIG. 6 to supply the coolant to the drive motor 130.

Reference numeral '630' in FIG. 6 represents a control table when the SOC of the battery 140 is high in the running mode.

If the SOC of the battery 140 is higher than or equal to the reference value at the step S530, the vehicle controller 250 determines whether the motor temperature is higher than or equal to the first reference temperature at step S560. If the SOC of the battery 140 is high, there is high probability that the vehicle runs at the EV mode and therefore, the motor temperature of the drive motor 130 rises Therefore, the flow rate of the coolant is increased to suppress temperature rise of the drive motor 130.

If the motor temperature is higher than or equal to the first reference temperature, the vehicle controller 250 operates the water pump 135 with the first pump control rotation speed at step S565. In other words, if the motor temperature is higher than or equal to the first reference temperature, the vehicle controller 250 reads the first pump control rotation speed through the control table. That is, the vehicle controller 250 operates the water pump 135 with the first pump control rotation speed read from the control table that is designated as reference numeral '630' in FIG. 6 and increases the flow rate of the coolant supplied to the drive motor 130.

If the motor temperature is lower than the first reference temperature, the vehicle controller 250 operates the water pump 135 with the second pump control rotation speed at step S570. In other words, if the motor temperature is lower than the first reference temperature, the vehicle controller 250 reads the second pump control rotation speed through the control table. The vehicle controller 250 operates the water pump 135 with the second pump control rotation speed read from the control table that is designated as reference numeral '630' in FIG. 6.

Figure 7:
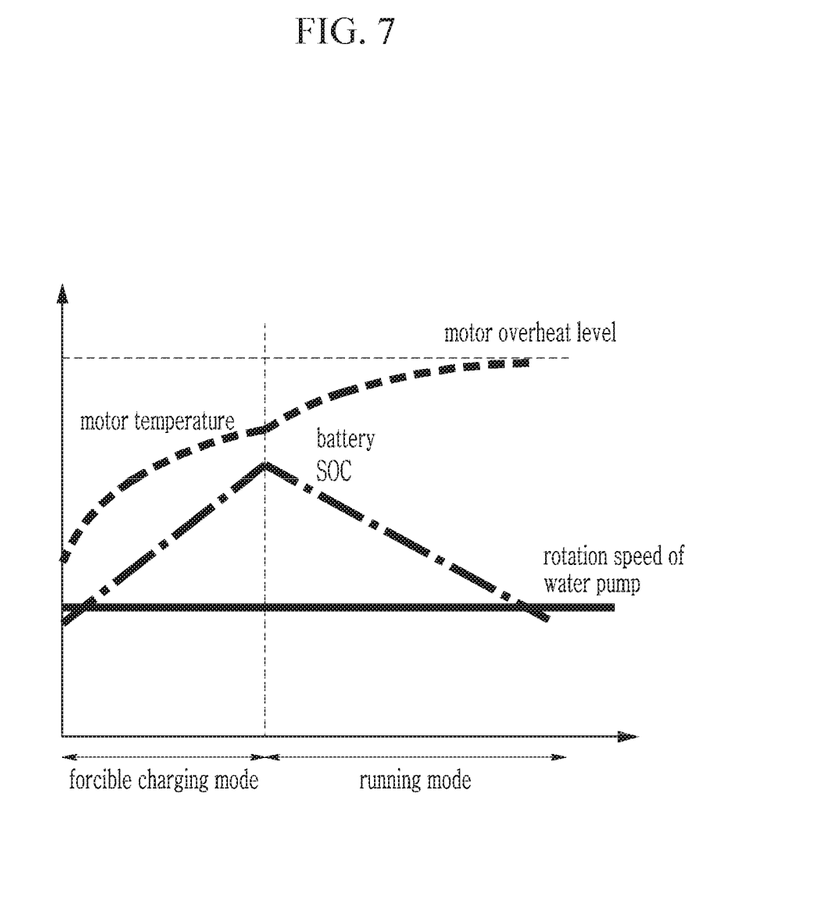
FIG. 7 is a graph illustrating driving state based on a driving mode applicable to a method of controlling motor temperature.

The system of controlling motor temperature for a green car in some forms of the present disclosure, as shown in FIG. 7, can cool the drive motor 130 by operating the water pump 135 with the first pump control rotation speed if the driving mode is the forcible charging mode. Therefore, motor temperature rise in the running mode may be postponed, thereby increasing time for which the vehicle runs at the EV mode. At this time, the SOC of the battery 140 is charged in the forcible charging mode and is consumed when the vehicle runs.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system of controlling motor temperature for a plug-in hybrid vehicle, comprising:
   a drive motor as a power source;
   a battery configured to provide a driving voltage to the drive motor;
   a water pump configured to supply coolant to the drive motor to cool the drive motor;
   a data detector configured to detect data regarding a driving state of the plug-in hybrid vehicle, wherein the driving state includes a forcible charging mode and a running mode; and
   a vehicle controller configured to:
      determine a driving mode based on the data regarding the driving state of the plug-in hybrid vehicle;
      determine pump control rotation speed based on the driving mode, a state of charge (SOC) of the battery, or the motor temperature of the drive motor, wherein first pump control rotation speed is greater than second pump control rotation speed and third pump control rotation speed, and the second pump control rotation speed is greater than the third pump control rotation speed; and
      operate the water pump based on the pump control rotation speed to change flow rate of the coolant supplied to the drive motor.

2. The system of claim 1, wherein, when the driving mode is a forcible charging mode, the vehicle controller is configured to operate the water pump with the first pump control rotation speed.

3. The system of claim 1, wherein the vehicle controller is configured to:
when the driving mode is a running mode, determine whether the SOC of the battery is lower than a reference value;
when the SOC of the battery is less than the reference value, determine whether the motor temperature is higher than or equal to first reference temperature;
when the motor temperature is greater than or equal to the first reference temperature, determine whether the motor temperature is higher than or equal to second reference temperature; and
when the motor temperature is greater than or equal to the second reference temperature, operate the water pump with the first pump control rotation speed.

4. The system of claim 3, wherein, when the SOC of the battery is less than the reference value, and the motor temperature is greater than or equal to the first reference temperature and is less than the second reference temperature, the vehicle controller is configured to operate the water pump with the second pump control rotation speed.

5. The system of claim 3, wherein, when the SOC of the battery is less than the reference value and the motor temperature is less than the first reference temperature, the vehicle controller is configured to operate the water pump with the third pump control rotation speed.

6. The system of claim 1, wherein the vehicle controller is configured to:
when the driving mode is the running mode and the SOC of the battery is greater than or equal to the reference value, determine whether the motor temperature is higher than or equal to the first reference temperature; and
when the motor temperature is greater than or equal to the first reference temperature, operate the water pump with the first pump control rotation speed.

7. The system of claim 6, wherein, when the SOC of the battery is greater than or equal to the reference value and the motor temperature is less than the first reference temperature, the vehicle controller is configured to operate the water pump with the second pump control rotation speed.

8. The system of claim 1, wherein the pump control rotation speed is determined as any one from the first pump control rotation speed, the second pump control rotation speed, or the third pump control rotation speed, wherein each of the first, the second, and third pump control rotation speed is predetermined differently from one another based on the driving mode, the SOC of the battery, and the motor temperature of the drive motor.

9. The system of claim 8, wherein the first pump control rotation speed is the highest, the second pump control rotation speed is lower than the first pump control rotation speed, and the third pump control rotation speed is the lowest.

10. A method of controlling motor temperature for a plug-in hybrid vehicle, comprising:
determining a driving mode of the plug-in hybrid vehicle, wherein the driving mode includes a forcible charging mode and a running mode;
determining whether a state of charge (SOC) of a battery is less than a reference value based on a determination that the driving mode is the running mode;
determining whether motor temperature is greater than or equal to first reference temperature based on a determination that the SOC of the battery is less than the reference value;
determining whether the motor temperature is greater than or equal to second reference temperature based on a determination that the motor temperature is greater than or equal to the first reference temperature; and
operating a water pump with first pump control rotation speed that is greater than second pump control rotation speed and third pump control rotation speed based on a determination that the motor temperature is greater than or equal to the second reference temperature, wherein the second pump control rotation speed is greater than the third pump control rotation speed.

11. The method of claim 10, wherein the method comprises:
operating the water pump with the second pump control rotation speed based on a determination that the motor temperature is less than the second reference temperature.

12. The method of claim 10, wherein the method comprises:
operating the water pump with the third pump control rotation speed based on a determination that the motor temperature is less than the first reference temperature.

13. The method of claim 10, wherein the method further comprises:
determining whether the motor temperature is greater than or equal to the first reference temperature based on a determination that the SOC of the battery is greater than or equal to the reference value; and
operating the water pump with the first pump control rotation speed based on the determination that the motor temperature is greater than or equal to the first reference temperature.

14. The method of claim 13, wherein the method comprises:
operating the water pump with the second pump control rotation speed based on the determination that the motor temperature is less than the first reference temperature.

15. The method of claim 10, wherein the method further comprises:
operating the water pump with the first pump control rotation speed based on a determination that the driving mode is the forcible charging mode.

16. A method of controlling motor temperature for a plug-in hybrid vehicle, comprising:
determining a driving mode of the plug-in hybrid vehicle based on data regarding a driving state, wherein the driving state includes a forcible charging mode and a running mode;
determining first pump control rotation speed that is greater than second pump control rotation speed and third pump control rotation speed based on a determination that the driving mode is the forcible charging mode, wherein the second pump control rotation speed is greater than the third pump control rotation speed; and
operating a water pump with the first pump control rotation speed to control flow rate of coolant supplied to a drive motor.

17. The method of claim 16, wherein the method further comprises:
determining pump control rotation speed corresponding to a state of charge (SOC) of a battery and a motor temperature of the drive motor based on a determination that the driving mode is the running mode;

operating the water pump with the pump control rotation speed.

18. The method of claim 17, wherein the method comprises:

determining the first pump control rotation speed as the pump control rotation speed based on the determination that the SOC of the battery is greater than or equal to a reference value, and the motor temperature is greater than or equal to first reference temperature; and determining the second pump control rotation speed as the pump control rotation speed based on a determination that the SOC of the battery is greater than or equal to the reference value, and the motor temperature is less than the first reference temperature.

19. The method of claim 17, wherein the method further comprises:

determining the first pump control rotation speed as the pump control rotation speed based on the determination that the SOC of the battery is less than the reference value, the motor temperature is greater than or equal to the first reference temperature, and the motor temperature is less than or equal to second reference temperature;

determining the second pump control rotation speed as the pump control rotation speed based on the determination that the SOC of the battery is less than the reference value, the motor temperature is greater than or equal to the first reference temperature, and the motor temperature is less than the second reference temperature; and determining the third pump control rotation speed as the pump control rotation speed based on the determination that the SOC of the battery is less than the reference value, and the motor temperature is less than the first reference temperature.

* * * * *